United States Patent
Scott, III et al.

(10) Patent No.: US 12,527,317 B2
(45) Date of Patent: Jan. 20, 2026

(54) BODY TISSUE PRESERVATION SYSTEM AND METHOD

(71) Applicant: UNIVERSITY OF NEWCASTLE UPON TYNE, Newcastle upon Tyne (GB)

(72) Inventors: William Earl Scott, III, Newcastle upon Tyne (GB); Stuart Kay, Newcastle upon Tyne (GB); Leo Freitas, Newcastle upon Tyne (GB)

(73) Assignee: University of Newcastle Upon Tyne, Newcastle (GB)

( * ) Notice: Subject to any disclaimer, the term of this patent is extended or adjusted under 35 U.S.C. 154(b) by 672 days.

(21) Appl. No.: 17/913,927

(22) PCT Filed: Mar. 26, 2021

(86) PCT No.: PCT/GB2021/050754
§ 371 (c)(1),
(2) Date: Sep. 23, 2022

(87) PCT Pub. No.: WO2021/191632
PCT Pub. Date: Sep. 30, 2021

(65) Prior Publication Data
US 2023/0337660 A1  Oct. 26, 2023

(30) Foreign Application Priority Data

Mar. 26, 2020 (GB) ..................... 2004380

(51) Int. Cl.
*A01N 1/143* (2025.01)
(52) U.S. Cl.
CPC ..................... *A01N 1/143* (2025.01)
(58) Field of Classification Search
None
See application file for complete search history.

(56) References Cited

U.S. PATENT DOCUMENTS

| | | |
|---|---|---|
| 2004/0058432 A1 | 3/2004 | Owen et al. |
| 2005/0153271 A1 | 7/2005 | Wenrich |

(Continued)

FOREIGN PATENT DOCUMENTS

| | | |
|---|---|---|
| CN | 207355342 U | 5/2018 |
| EP | 3569064 | 11/2019 |
| WO | 2018/144515 | 8/2018 |

OTHER PUBLICATIONS

Ross et al., webpage titled "7.3 Authentication: Who are You?", cached as early as Sep. 12, 2017 by Internet Archive, <https://userpages.umbc.edu/~dgorin1/451/security/dcomm/authentication.htm> (Year: 2017).*

(Continued)

*Primary Examiner* — Holly Kipouros
(74) *Attorney, Agent, or Firm* — Barnes & Thornburg

(57) ABSTRACT

A body tissue preservation system (300) for storage and preservation of body tissue (114), the system comprising: abase unit (200) having a reader (240) configured to obtain data from a machine-readable marker; a container unit (100) that is arranged to receive the body tissue, comprises a machine-readable marker (140) (e.g. QR code, bar code, RFID) and is configured as an insert for the base unit; and a controller configured to control at least one operational parameter of the storage and/or preservation of the body tissue based on the obtained data. The body tissue preservation system is configured to perfuse or persufflate the body tissue in the container unit. The reader may be operable to modify the machine-readable marker. The reader may be configured to perform an authentication process with the marker. A body tissue preservation system configured to perform a digital handshake is also provided, the system comprising a base unit having a first communications inter- (Continued)

face and a container unit comprising a second communications interface.

17 Claims, 4 Drawing Sheets

(56) References Cited

U.S. PATENT DOCUMENTS

| | | | |
|---|---|---|---|
| 2012/0178150 A1 | 7/2012 | Tempelman et al. | |
| 2014/0230815 A1* | 8/2014 | Gribb | A61M 16/0666 |
| | | | 435/284.1 |
| 2015/0243392 A1* | 8/2015 | Fournier | G21F 7/053 |
| | | | 29/407.05 |
| 2016/0342942 A1* | 11/2016 | Rice | A01N 1/148 |
| 2022/0290091 A1* | 9/2022 | Abraham | G16H 40/67 |

OTHER PUBLICATIONS

Search and Examination Report issued in Appl. No. GB2004380.8 (Sep. 14, 2020).
Examination Report issued in Appl. No. GB2004380.8 (May 4, 2021).
Search Report & Written Opinion issued in Int'l Appl. No. PCT/GB2021/050754 (2021).

* cited by examiner

BODY TISSUE PRESERVATION SYSTEM AND METHOD

CROSS-REFERENCE TO RELATED APPLICATIONS

This application is a United States nationalization under Section 371 of PCT Application No. PCT/GB2021/050754, filed Mar. 26, 2021, which claims priority from United Kingdom Application No. GB 2004380.8, filed on Mar. 26, 2020, the entirety of which are each fully incorporated by reference herein.

TECHNICAL FIELD

The present disclosure relates to the field of body tissue preservation systems and methods. In particular, the present disclosure relates to body tissue preservation systems and methods for the storage and/or preservation of body tissue, such as extracorporeal body tissue.

BACKGROUND

In some cases, one or more organs may be harvested from a person after they have died (or voluntarily while still alive), and these organs can be used in another person. In which case, a surgeon may remove a relevant organ from the patient. The organ is then transferred so that it can be inserted into another patient. During this process, there will be a time period in which the organ is not connected to either patient, and this organ is to be maintained in a suitable state so that it may still be useful once it has been inserted into a patient. In this time period the organ may have to be transported, such as from one hospital to another. Storage apparatuses have been disclosed which are designed to facilitate this transfer of an organ.

Aspects of the present disclosure seek to provide improved systems and methods for the storage and/or preservation of body tissue.

SUMMARY

Aspects of the disclosure are set out in the independent claims and optional features are set out in the dependent claims. Aspects of the disclosure may be provided in conjunction with each other, and features of one aspect may be applied to other aspects.

In an aspect there is provided, a body tissue preservation system for storage and preservation of body tissue. The system comprises: a base unit having a reader configured to obtain data from a machine-readable marker; a container unit arranged to receive body tissue to be stored and preserved, wherein the container unit comprises a machine-readable marker and is configured as an insert for the base unit; and a controller configured to control at least one operational parameter of the storage and/or preservation of body tissue in the container unit based on data obtained from the machine-readable marker.

Embodiments may provide a more reliable system, which is less vulnerable to human error, such as inputting incorrect details for operational parameters of the storage and/or preservation of body tissue. Embodiments may facilitate a more streamlined connection between base unit and container unit, such as to facilitate quicker connections and to reduce an amount of data a user needs to input prior to initiating storage and/or preservation of body tissue. The system may be portable to facilitate transport of the body tissue.

The machine-readable marker and the reader may be configured to perform an authentication process to establish authenticated communication prior to transmission of data based on which the at least one operational parameter of the storage and/or preservation is to be based. The reader may be operable to modify the machine-readable marker to modify data carried by the machine-readable marker. The reader may be configured to modify the data carried by the machine-readable marker to enable a reader to obtain therefrom an indication of whether or not the container unit has previously been used. The controller may be configured to inhibit use of a container unit which has previously been used for the storage and preservation of body tissue. The reader may be configured to modify the machine-readable marker to provide a time stamp for interaction between the machine-readable marker and the reader. The reader may be operable to modify the machine-readable marker to enable a reader to obtain an intended time period of operation for the container unit from the modified machine-readable marker.

The system may be configured to store and preserve extracorporeal body tissue. For example, the system may be configured to store and preserve body tissue, such as organs, which are to be stored outside of a patient's body and/or transported from one location to another outside a patient's body. The body tissue preservation system may be configured to persufflate body tissue in the container unit. For example, the system may be configured to deliver persufflation fluid (e.g. gas) to the body tissue. This may comprise delivery of persufflation gas to the veins and/or arteries of the body tissue. The system may include a store of persufflation fluid to be delivered to the body tissue.

Controlling an operational parameter may comprise controlling the delivery of persufflation fluid to the body tissue. The machine-readable marker may be configured to enable the reader to establish at least one property associated with the delivery of persufflation fluid to the body tissue. For example, this property may be an indication of desired pressure/temperature/flow rate/gas concentration ranges and/or target values for the persufflation fluid to be delivered to the body tissue. Example gas concentration ranges may include a concentration of a persufflation gas used to persufflate the body tissue, and/or an indication of oxygen levels of gas being supplied to the body tissue. The controller may be configured to control persufflation of the body tissue based on the obtained data. The body tissue preservation system may be for storage and persufflation of body tissue, e.g. the system may be configured to store and persufflate body tissue (in the container unit).

The machine-readable marker is configured to enable the reader to obtain therefrom container unit data indicative of at least one of: (i) a property of the container unit, (ii) a property of the body tissue in the container unit, and/or (iii) one or more operational parameters for the storage and/or preservation of the body tissue in the container unit, such as one or more alarm conditions for providing an alarm output (e.g. threshold measurement values at which an alarm condition is triggered). The reader may obtain the container unit data from the machine-readable marker by reading the marker. The controller may be configured to control the at least one operational parameter based on the obtained container unit data. Obtained container unit data may provide an indication of a time constraint for using the container unit. The controller may be configured to identify a time period during which use of the container unit is intended based on the obtained time constraint. The controller may be configured to inhibit use of the container unit outside the time period. The controller may be configured to inhibit use of a container unit which has previously been used for the storage and preservation of body tissue. The machine-readable marker may comprise a first communications interface. The reader may comprise a second communications interface. The first and second communications interfaces may communicate to enable transmission of data for enabling control of at least one operational parameter for the storage and/or preservation of body tissue.

The controller may be coupled to a data store storing an association between (i) a property of a body tissue and (ii) at least one operational parameter for the storage and/or preservation of body tissue having said property. The machine-readable marker may be configured to enable the reader to obtain therefrom container unit data indicative of a property of the body tissue. The controller may be configured to select at least one operational parameter of the storage and/or preservation of the body tissue based on the at least one operational parameter in the stored association corresponding to the obtained property of the body tissue. The machine-readable marker may be configured to enable the reader to obtain therefrom at least one indicated operational parameter for storage and/or preservation of the body tissue in the container unit. The controller may be configured to control the at least one indicated operational parameter for the storage and/or preservation of body tissue in the container unit.

Controlling at least one operational parameter may comprise selecting a threshold and/or target value for the operational parameter based on the data obtained from the machine-readable marker. The machine-readable marker may be configured to enable the reader to obtain therefrom data indicative of a type of the body tissue in the container unit. The threshold and/or target value may be selected based on the obtained indication of the type of body tissue in the container unit. The machine-readable marker may be configured to enable the reader to obtain therefrom expiration data indicative of an expiration time for using the container unit. In the event that the expiration data indicates that the expiration time for using the container unit has passed, the controller may be configured to output an expiration signal. The machine-readable marker may be configured to enable the reader to obtain therefrom usage data indicative of a usage count for the container unit. The controller may be configured to prevent use of a container unit which has previously been used.

The reader may be operable to modify the machine-readable marker to modify data carried by the machine-readable marker. The reader may be operable to modify the machine-readable marker so that subsequent data obtained from the machine-readable marker is different to previously-obtained from the machine-readable marker. The reader may be operable to modify the machine-readable marker so that the modified machine-readable marker is configured to enable the reader to obtain therefrom an initiation time at which operation between the container unit and the base unit started. The machine-readable marker may be configured to enable the reader to obtain therefrom duration data indicative of a maximum duration of time for which the container unit is to be used. The controller may be configured to output an end-time signal in the event that the maximum duration of time for which the container unit is to be used has passed since the initiation time at which operation between the container unit and the base unit started.

The reader may be operable to modify the machine-readable marker to provide a time stamp for interaction between the machine-readable marker and the reader, The reader may be configured to provide the time stamp so that the modified machine-readable marker is configured to enable a reader to obtain therefrom an intended time period of operation for the container unit.

The at least one operational parameter may comprise at least one of: (i) a flow of preservation fluid (e.g. a flow of persufflation fluid for anterograde persufflation), and (ii) a pressure of preservation fluid (e.g. a pressure of persufflation fluid for retrograde persufflation). The insert (container unit) may be a single use component. Each of the reader and the machine-readable marker may comprise a radiofrequency (RF) transceiver, such as RFID componentry. The system may be configured to operate in either an anterograde mode or a retrograde mode. For example, persufflation fluid may be delivered in the retrograde mode or the anterograde mode. In the anterograde mode, fluid (e.g. a persufflation gas) is delivered into the body tissue through one or more arteries, and is taken out of the body tissue from one or more veins (e.g. the flow of persufflation fluid enters through the artery and is drained through the vein). In the retrograde mode, fluid (e.g. persufflation fluid) is delivered to the veins of the body tissue, and exits through pricked holes in the body tissue. The machine-readable marker may be configured to enable the controller to determine whether to operate in the anterograde mode or in the retrograde mode.

The base unit may comprise a container unit receiving portion for receiving the container unit. The reader may be arranged within the base unit, and the machine-readable marker may be arranged in the container unit, so that when the container unit is received in the container unit receiving portion of the base unit, the machine-readable marker is adjacent the reader. The container unit may comprise: (i) a body tissue receiving portion arranged to receive a body tissue to be stored and/or preserved, and (ii) a flange extending away from the body tissue receiving portion. The flange may comprise the machine-readable marker.

At least one of the reader and the machine-readable marker may be configured to inhibit operational parameter data to be obtained from the machine-readable marker by the reader until after an authorisation (e.g. authentication) exchange between the machine-readable marker and the reader. For example, said exchange may comprise the authentication process disclosed herein (e.g. to be performed prior to transmission of data based on which the at least one operational parameter of the storage and/or preservation is to be based).

The machine-readable marker and the reader may be configured to provide an authentication process (e.g. a digital handshake). For example, the authentication process may comprise establishing authenticated communication between the two. Each of the machine-readable marker and the reader may be configured to mutually-authenticate. Mutual authentication may occur prior to transmission of any data based on which the at least one operation parameter of the storage and/or preservation of body tissue is to be based.

The reader may be configured to (e.g. to perform the authentication process) transmit a first authentication signal to the machine-readable marker including a base unit nonce. The machine-readable marker may be configured to transmit a second authentication signal to the reader including a container unit nonce. The first authentication signal may comprise the base unit nonce digitally signed by the base unit, e.g. the first authentication signal may comprise a payload which includes the base unit nonce and which carries a digital signature of the base unit. The second authentication signal may comprise the container unit nonce digitally signed by the container unit, e.g. the second authentication signal may comprise a payload which includes the container unit nonce and which carries a digital signature of the container unit. Each of the first and/or second authentication signals may be encrypted. For example, the container unit may obtain and/or have stored data for processing encrypted data from the base unit, and/or the base unit may obtain and/or have stored data for processing encrypted data from the container unit. For example, each may use a public-private encryption scheme (e.g. based on a container unit encryption key and/or a base unit encryption key).

The reader may be configured to transmit a data request signal to the machine-readable marker comprising a request for the data based on which the at least one operational parameter of the storage and/or preservation of body tissue in the container unit is to be controlled. The machine-readable marker may be configured to respond to the data request signal by transmitting a data response signal to the reader. The data response signal may comprise the data based on which the at least one operational parameter of the storage and/or preservation of body tissue in the container unit is to be controlled. At least one of the signals transmitted between the reader and machine-readable marker may be digitally signed and/or encrypted. For example, the data request signal may comprise a payload which includes an indication of the data requested, and this payload may be digitally signed by the base unit. For example, the data response signal may comprise a payload which includes an indication of the requested data, and this payload may be digitally signed by the container unit. Each of these data request and data response signals may also be encrypted (e.g. based on a respective container unit encryption key and a base unit encryption key).

In an aspect, there is provided a method of controlling interaction between: (i) a container unit arranged to receive body tissue to be stored and preserved, and (ii) a base unit configured to receive the container unit for storing and preserving a body tissue in the container unit. The method comprises exchanging authentication signals between the container unit and the base unit to establish an authenticated connection, and transmitting data between the container unit and the base unit to enable the storage and/or preservation of the body tissue in the container unit to be controlled based on the data transmitted between the container unit and the base unit.

The container unit may comprise a machine-readable marker. The base unit may comprise a reader configured to read machine-readable markers. Transmission of signals between the base unit and the container unit may comprise transmission of signals from the reader to the machine-readable marker and/or from the machine-readable marker to the base unit.

The authentication protocol (e.g. exchanging authentication signals) may comprise use of one or more public-private key encryptions. For example, this may comprise use of a base unit encryption key and a container unit encryption key. Exchanging authentication signals may comprise the base unit transmitting a first authentication signal to the container unit. The first authentication signal may comprise a base unit nonce and/or a base unit encryption key (e.g. a public key for the base unit). The container unit may have stored data indicative of the base unit encryption key. The first authentication signal may comprise a digital signature from the base unit. Exchanging authentication signals may comprise the container unit transmitting a second authentication signal to the base unit. The second authentication signal may comprise a container unit nonce and/or a container unit encryption key (e.g. a public key for the container unit). The base unit may have stored data indicative of the base unit encryption key. The second authentication signal may comprise a digital signature from the base unit. The second authentication signal may be sent after the container unit has received the first authentication signal. The second authentication signal may be encrypted using the base unit encryption key. Use of nonces (e.g. cryptographic nonces) may inhibit use of old communications (e.g. previously used communications), such as to inhibit use of old container units.

Transmitting data between the container unit and the base unit to enable the storage and/or preservation of the body tissue in the container unit to be controlled based on the data transmitted between the container unit and the base unit may comprise transmission of a data request signal and a data response signal. The base unit may transmit a data request signal to the container unit. The data request signal may comprise a request for one or more items of data from the container unit. The data request signal may comprise a digital signature from the base unit. The data request signal may be encrypted using the container unit encryption key. The requested data may comprise a request for data based on which at least one operational parameter of the storage and/or preservation of body tissue in the container unit is to be controlled. The container unit may transmit a data response signal to the base unit. The data response signal may be transmitted after receiving the data request signal. The data response signal may comprise the data requested in the data request signal. The data response signal may comprise a digital signature from the container unit.

The data response signal may be encrypted using the base unit encryption key. The data response signal may comprise data based on which the at least one operational parameter of the storage and/or preservation of body tissue in the container unit is to be controlled.

At each relevant stage in the interaction between the base unit and the container unit, the payload of a signal may include a digital signature. Each digitally signed payload may be checked to establish that the signature is as expected. For example, in the event that it is determined that the digital signature does not correspond to that of a device with which interaction had previously been established, the devices may cease interaction. In the event that the digital signature is as expected, then the interaction protocol proceeds accordingly. At each relevant stage in the interaction between the base unit and the container unit, the relevant unit may use its private encryption key to decrypt signals transmitted to that unit.

The at least one operational parameter of the storage and/or preservation of the body tissue in the container unit may be controlled based on the data obtained in the data response signal.

In an aspect, there is provided a method of controlling a body tissue preservation system for storage and preservation of body tissue. The system comprises: a base unit having a reader configured to obtain data from a machine-readable marker; a container unit arranged to receive body tissue to be stored and preserved, wherein the container unit comprises a machine-readable marker and is configured as an insert for the base unit. The method comprises: transmitting a first authentication signal from the base unit to the container unit, wherein the first authentication signal comprises a base unit nonce; transmitting a second authentication signal from the container unit to the base unit, wherein the second authentication signal comprises a container unit nonce; transmitting a data request signal from the base unit to the container unit, wherein the data request signal comprises a request for data based on which at least one operational parameter of the storage and/or preservation of body tissue in the container unit is to be controlled; transmitting a data response signal from the container unit to the base unit, wherein the data response signal comprises the data based on which the at least one operational parameter of the storage and/or preservation of body tissue in the container unit is to be controlled; and controlling the at least one operational parameter of the storage and/or preservation of body tissue in the container unit based on the data in the data response signal.

The first authentication signal may be digitally signed by the base unit. The first authentication signal may be encrypted based on a container unit encryption key (e.g. a container unit encryption key may be stored at the base unit and/or may have previously been received from the container unit). The second authentication signal may be digitally signed by the container unit. The second authentication signal may be encrypted based on a base unit encryption key (e.g. a base unit encryption key stored in the container unit and/or a base unit encryption key previously received from the base unit such as one received in the first authentication signal). The data request signal may be digitally signed by the base unit. The data request signal may be encrypted based on a container unit encryption key (e.g. a container unit encryption key stored in the base unit and/or a container unit encryption key previously received from the container unit such as one received in the second authentication signal). The data response signal may be digitally signed by the container unit. The data response signal may be encrypted based on a base unit encryption key (e.g. a base unit encryption key stored in the container unit and/or a base unit encryption key previously received from the base unit such as one received in the first authentication signal).

In an aspect, there is provided a body tissue preservation system for storage and preservation of body tissue. The system comprises: a base unit having a first communications interface; and a container unit arranged to receive body tissue to be stored and preserved, wherein the container unit comprises a second communications interface and is configured as an insert for the base unit. The first communications interface of the base unit and the second communications interface of the container unit are configured to perform a digital handshake. The system is configured to inhibit or permit storage and preservation of body tissue in the container unit based on the digital handshake. The system may be configured to control operation (e.g. an operational parameter) of the storage and/or preservation of body tissue based on the digital handshake. The digital handshake may comprise a mutual-authentication process as disclosed herein, such as one which comprises exchanging authentication signals (e.g. first and second authentication signals). For example, the system may be configured to first perform the handshake. The system may only control at least one operational parameter after the handshake has been performed, such as in the event that the handshake is successful (e.g. if digital signatures/nonces/encryption keys exchanged during the handshake conform to expected requirements). The system may inhibit any control of an operational parameter if the handshake is unsuccessful (e.g. if digital signatures/nonces/encryption keys exchanged during the handshake do not conform to expected requirements). The system may inhibit any interaction (e.g. further interaction) between the container unit and the base unit based on the digital handshake, such as in the event that the digital handshake is unsuccessful.

Aspects may enable the provision of greater security in the exchange, such as to prevent third parties from gaining access to data relating to types of body tissues and/or operational parameters for the storage and/or preservation of such body tissues.

In an aspect, there is provided a container unit for a body tissue preservation system for storage and preservation of body tissue. The container unit is arranged to receive a body tissue to be stored and preserved. The body tissue preservation system comprises: (i) a base unit having a reader configured to obtain data from a machine-readable marker, and (ii) a controller configured to control at least one operational parameter of the storage and/or preservation of body tissue in the container unit. The container unit comprises: a machine-readable marker; wherein the container unit is configured as an insert for a said base unit; and wherein the machine-readable marker is configured to enable the reader to obtain therefrom property data indicative of a property of the container unit and/or the body tissue in the container unit. The machine-readable marker may be configured to perform an authentication process with said reader to establish authenticated communication prior to transmission of the property data from the machine-readable marker of the container unit to the reader of the base unit.

In an aspect, there is provided a base unit for a body tissue preservation system for storage and preservation of body tissue. The base unit comprises: a container unit receiving portion arranged to receive a container unit comprising a machine-readable marker and carrying a body tissue to be stored and preserved; and a reader configured to obtain data from a said machine-readable marker of a said container unit; wherein the reader is configured to obtain data from the machine-readable marker of the container unit, and to facilitate control of at least one operational parameter of the storage and/or preservation of the body tissue in the container unit based on the data obtained from the machine-readable marker. The reader may be configured to perform an authentication process with said machine-readable marker to establish authenticated communication prior to obtaining data from the machine-readable marker based on which the at least one operational parameter of the storage and/or preservation is to be based.

In an aspect, there is provided a body tissue monitoring system comprising: base unit having a reader configured to obtain data from a machine-readable marker; a machine-readable marker associated with a body tissue to be monitored; and a controller configured to monitor and control at least one parameter of the body tissue and/or the environment surrounding the body tissue. The reader is configured to obtain an indication of a time constraint from the machine-readable marker. The controller is configured to identify a time period during which the body tissue is to be monitored and controlled based on the obtained indication of a time constraint, and wherein the controller is configured to monitor and control the body tissue during the time period and to inhibit monitoring and controlling of the body tissue outside the time period. The body tissue monitoring system may comprise a body tissue preservation system disclosed herein. The machine-readable marker may be provided on a container unit as disclosed herein. The base unit may comprise a base unit disclosed herein. The body tissue monitoring system may be configured to control monitoring and controlling body tissue based on time bombing functionality disclosed herein.

In an aspect, there is provided a method of storing and preserving a body tissue in a system comprising: (i) a base unit having a reader configured to obtain data from a machine-readable marker; and (ii) a container unit arranged to receive body tissue to be stored and preserved. The container unit comprises a machine-readable marker and is configured as an insert for the base unit. The method comprises: controlling at least one operational parameter of the storage and/or preservation of body tissue in the container unit based on data obtained from the machine-readable marker using the reader. The method may comprise performing an authentication process to establish authenticated communication between the machine-readable marker of the container unit and the reader of the base unit. For example, once authenticated communication has been established, the method may comprise using the reader to obtain data from the machine-readable marker. The at least one operational parameter of the storage and/or preservation of body tissue in the container unit may be controlled based on said data obtained from the machine-readable marker using the reader.

Aspects of the present disclosure provide computer program products comprising computer program instructions configured to program a controller to perform the methods disclosed herein.

FIGURES

Some examples of the present disclosure will now be described, by way of example only, with reference to the figures, in which.

In the drawings like reference numerals are used to indicate like elements.

SPECIFIC DESCRIPTION

Examples disclosed herein relate to a body tissue preservation system for storing and preserving body tissue. The preservation system includes a base unit and a container unit. The container unit may receive a body tissue to be stored and preserved. The base unit may include components for preserving the body tissue, such as a source of preserving fluid and temperature control. The container unit may be inserted into the base unit for storage and preservation of the body tissue. The container unit includes a machine-readable marker and the base unit includes a reader for reading machine-readable markers. The machine-readable marker of the container is configured to enable data indicative of instructions for the storage and/or preservation of the body tissue in the container unit to be identified by the reader. The base unit may then control the storage and/or preservation of body tissue in the container unit based on the data indicative of instructions obtained by the reader.

One specific example of a body tissue preservation system will now be described with reference to FIGS. 1 to 4. It will be appreciated in the context of the present disclosure that this is one specific example, and that it is not to be considered limiting. Numerous alternatives of this system are described later to illustrate that not all of the features of FIGS. 1 to 4 are required and/or that additional features may also be included.

Figure 1:
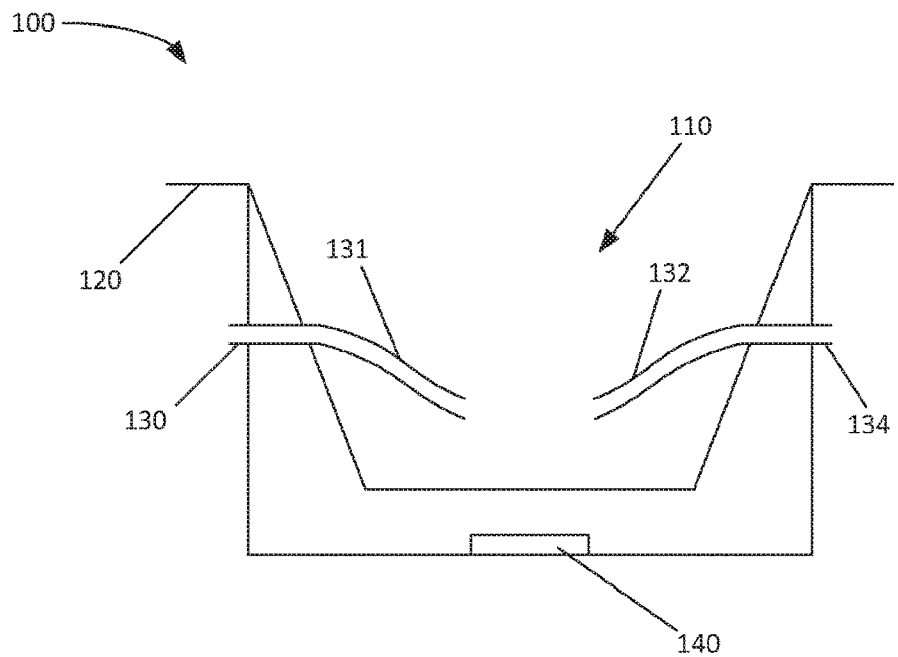
FIG. 1 is a schematic diagram of an example container unit.

FIG. 1 shows an example container unit 100. The container unit 100 includes a body tissue receiving portion 110, a flange 120 and a machine-readable marker 140. The container unit 100 also includes an inlet 130, an outlet 134 and one or more channels connected to the inlet 130 or outlet. A first channel 131 is connected to the inlet 130 to define a flow path from external to the container unit 100 into the body tissue receiving portion 110. A second channel 132 is connected to the outlet 134 to define a flow path from the body tissue receiving portion 110 to outside the container unit 100. One or more walls of the container unit 100 define a recess which provides the body tissue receiving portion 110. The inlet 130 and outlet 134 each extend through a portion of a wall defining the body tissue receiving portion 110. The flange 120 extends radially outward from the container unit 100. The machine-readable marker 140 is provided on an underside of the container unit 100. The machine-readable marker 140 is provided underneath a lower surface of the body tissue receiving portion 110.

The container unit 100 is configured as an insert for a base unit. It is sized and shaped to fit within a corresponding recess in a base unit. The container unit 100 is arranged to house a body tissue to be stored. This includes being configured to store the body tissue in a pool of preservation fluid. The container unit 100 is configured as a single-use component which is to be disposed of after having received a body tissue for storage and preservation.

The body tissue receiving portion 110 is sized and shaped to receive a body tissue to be stored and/or preserved. The body tissue receiving portion 110 is configured to store a pool of preservation fluid for the body tissue to be stored. The body tissue receiving portion 110 is configured to receive a body tissue, which in this example rests on the lower surface of the body tissue receiving portion 110, but may be suspended above the pool of preservation fluid. Body tissue resting on the lower surface will be immersed in the pool of preservation fluid retained in the body tissue receiving portion 110 or suspended above (such as for composite tissue).

The flange 120 is configured to support the container unit 100 when inserted into a base unit. The flange 120 is arranged to enable the container unit 100 to be inserted into the base unit and retained in position within the base unit. The flange 120 provides a lip from which the container unit 100 may be suspended into the base unit.

The inlet 130 is arranged to receive a source of incoming fluid from the base unit. The inlet 130 is configured to provide a flow path to enable fluid external to the container unit 100 to be delivered into the body tissue receiving portion 110. The first channel 131 is connected to the inlet 130 to extend the fluid flow path into the body tissue receiving portion 110. The first channel 131 is arranged to be inserted into a lumen of body tissue stored in the body tissue receiving portion 110 (such as a vein or an artery of an organ). The first channel 131 is configured to connect a source of fluid external to the container unit 100 (in the base unit) to body tissue stored in the container unit 100. The first channel 131 is arranged to enable delivery of fluid into the body tissue stored in the container unit 100.

The outlet 134 is arranged to enable fluid to leave the body tissue receiving region. The outlet 134 is arranged to enable fluid to flow out from the body tissue receiving region into a corresponding region of the base unit. The second channel 132 is connected to the inlet 130 and is also arranged to be inserted into a lumen of body tissue stored in the body tissue receiving portion 110. The second channel 132 and outlet 134 provide a fluid flow path for fluid in the lumen of the body tissue to be delivered out of the body tissue receiving portion 110. This fluid includes fluid pumped into the body tissue through the inlet 130 and first channel 131. The first and second channels are arranged to enable circulation of fluid so that fluid may be delivered to the body tissue through the inlet 130 and first channel 131 and then out of the body tissue and away from the container unit 100 through the second channel 132 and the outlet.

The machine-readable marker 140 is configured to enable data indicative of the container unit 100 and/or the body tissue in the container unit 100 to be obtained using a machine-readable marker 140 reader. The machine-readable marker 140 in this example includes a radiofrequency transceiver. The transceiver is configured to receive incident RF radiation and to respond by providing an RF output signal. The machine-readable marker 140 is configured to receive a first authentication signal providing authentication data from the base unit. The machine-readable marker 140 is configured to provide a second authentication signal based on both the authentication data from the base unit, and authentication data from the machine-readable marker 140. The machine-readable marker 140 is configured to then receive a data request signal from the base unit, and to respond with a data response signal.

In this example, the machine-readable marker 140 is operable to establish authenticated communication with the base unit. The machine-readable marker 140 is then operable to provide data to the base unit indicative of instructions for the storage and/or preservation of a body tissue contained in the container unit 100. The data indicative of instructions for the storage and/or preservation of body tissue comprise data indicative of at least one of: (i) the type of body tissue being stored, (ii) parameters for the storage and/or preservation of said body tissue, and (iii) data indicative of one or more properties of the container unit 100 itself.

In this example, the machine-readable marker 140 is configured to enable the reader to identify the type of body tissue being stored in the container unit 100.

Operation of the container unit 100 of FIG. 1 is described later with reference to FIGS. 3 and 4.

Figure 2:
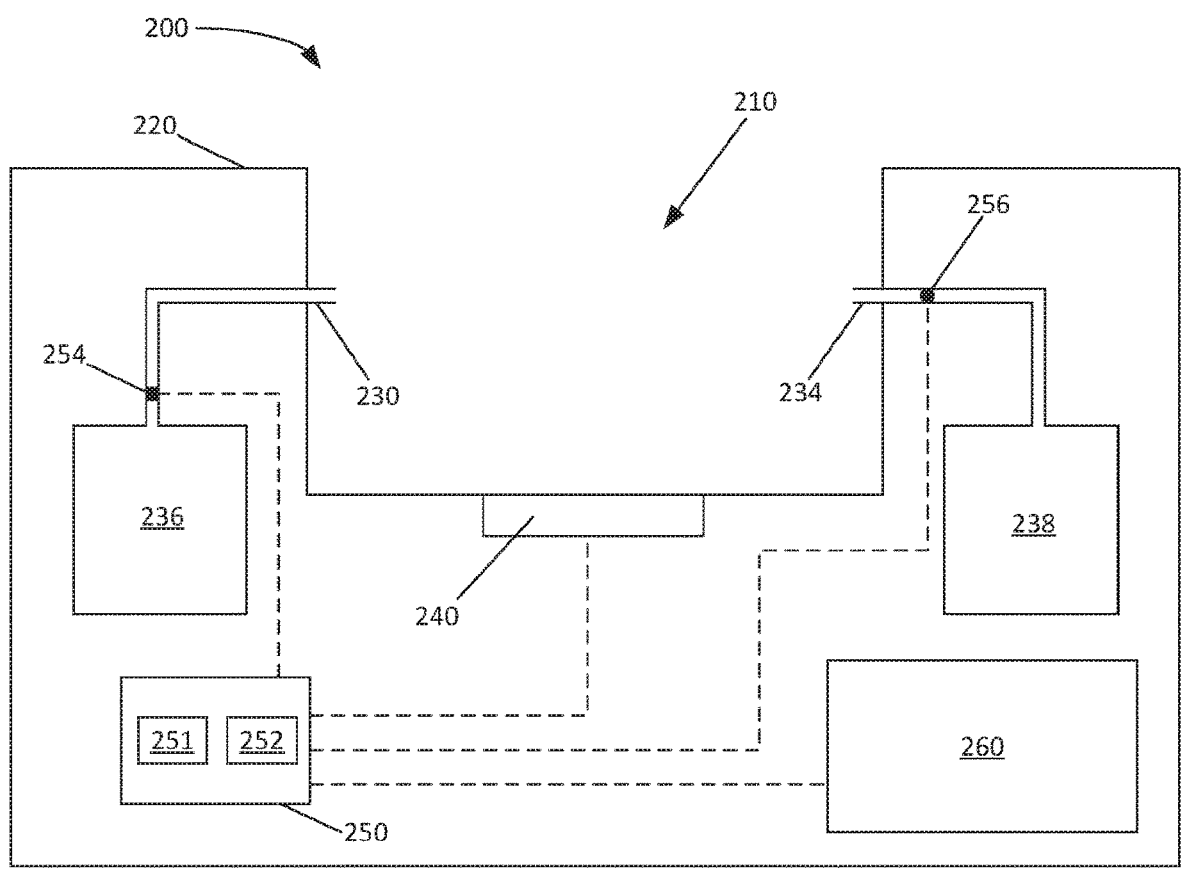
FIG. 2 is a schematic diagram of an example base unit.

FIG. 2 shows an example base unit 200. The base unit 200 includes a container unit receiving portion 210, a connection surface 220, a reader 240, a controller 250 and a display screen 260. The controller 250 includes a processor 251 and a data store 252. The base unit 200 also includes a first fluid store 236, a fluid outlet 230, a fluid inlet 234 and a second fluid store 238. The base unit 200 also includes a controllable valve 254 and a sensor 256.

The first fluid store 236 is connected to the fluid outlet 230. The fluid outlet 230 provides a connection into the container unit receiving portion 210 of the base unit 200 from a body of the base unit 200. The controllable valve 254 is provided between the first fluid store 236 and the fluid outlet 230. The second fluid store 238 is connected to the fluid inlet 234. The fluid inlet 234 provides a connection from the container unit receiving portion 210 into a body of the base unit 200. The sensor 256 is provided between the fluid inlet 234 and the second fluid store 238. The connection surface 220 is a top surface of the base unit 200. The container unit receiving portion 210 is a recess provided in the top surface of the base unit 200. The reader 240 is located underneath the container unit receiving portion 210. The reader 240 is located in a bottom surface of the container unit receiving portion 210. The controller 250 is connected to each of the controllable valve 254, the sensor 256, reader 240 and the display screen 260.

The base unit 200 is configured for storing and preserving body tissue. Body tissue in a container unit 100 may be stored and preserved inside the base unit 200. The base unit 200 is configured to control conditions within the environment of the container unit 100, as well as to control the supply of one or more preserving fluids to the body tissue in the container unit 100. The base unit 200 is configured to be portable. Although not shown, a lid and handle are provided to facilitate transport of the base unit 200. The base unit 200 is configured to receive a container unit 100 containing a body tissue to be stored and/or preserved and to enable connection of components of the base unit 200 to the container unit 100.

The container unit receiving portion 210 is arranged to receive a container unit 100. The container unit receiving portion 210 is arranged to hold a container unit 100 in the container unit receiving portion 210 to enable components of the base unit 200 to be connected to the container unit 100. The container unit receiving portion 210 is configured to support the container unit 100 to enable transport of the container unit 100 in the base unit 200 (while inhibiting damage to any body tissue carried in the container unit 100). The container unit receiving portion 210 is sized and shaped to receive a container unit 100 inside, and to permit a snug fit of the container unit 100.

The connection surface 220 of the base unit 200 is arranged support a flange 120 of a container unit 100 inserted in the base unit 200, and to enable the container unit 100 to be received in the container unit receiving portion 210. The connection surface 220 is the top surface of the base unit 200. It provides a surface against which the flange 120 of a container unit 100 may abut to secure the container unit 100 in the container unit receiving portion 210 of the base unit 200.

The first fluid store 236 comprises a source of preservation fluid to be delivered to the body tissue in the container unit 100. The first fluid store 236 is a tank of preservation fluid. The first fluid store 236 is provided in a body of the base unit 200. Fluid is stored under pressure in the fluid store.

The fluid outlet 230 is arranged to be connectable to a fluid inlet 130 of a container unit 100 in the container unit receiving portion 210. The fluid outlet 230 is arranged to enable fluid from a fluid source in the base unit 200 to be delivered into the container unit 100 (and to body tissue contained in the container unit 100). The fluid outlet 230 may connect to the fluid inlet 130 of the container unit 100 to provide a flow path from the first fluid store 236 of the base unit 200 into the body tissue in the container unit 100.

The controllable valve 254 is operable to control the rate of fluid flow out from the first fluid store 236 (and through the fluid outlet 230 to the body tissue in the container unit 100). In an open state, the valve 254 permits unrestricted flow of fluid from the first fluid store 236 through the fluid outlet 230. In a closed state, the valve 254 prevents any fluid flow from the first fluid store 236 through the fluid outlet 230. The valve 254 may be controlled to operate in one of a plurality of different states to control a rate of fluid flow through the fluid outlet 230.

The fluid inlet 234 is arranged to be connectable to fluid in the container unit receiving portion 210. The fluid inlet 234 is arranged to be connectable to a fluid outlet 134 of a container unit 100 in the container unit receiving portion 210. The fluid inlet 234 is configured to enable fluid to pass out from the container unit 100 and into the body of the base unit 200. The fluid inlet 234 is connectable to the fluid outlet 134 of the container unit 100 to enable fluid to flow from within body tissue in the container unit 100 in to the second fluid store 238 in the base unit 200. The second fluid storage tank is arranged to receive fluid from the fluid inlet 234 for storage. The arrangement may enable preserving fluid from the first fluid store 236 to be delivered to the body tissue in the container unit 100, and for used fluid which has passed through the body tissue to be delivered to the second fluid storage tank.

The sensor 256 is arranged to provide measurement values for at least one property of fluid flow. The sensor 256 is arranged to provide an indication of a pressure of the preservation fluid being delivered to the body tissue in the container unit 100. In this example, the sensor 256 is a pressure sensor 256 configured to obtain an indication of a pressure of fluid which has passed through the body tissue in the container unit 100.

The reader 240 is arranged proximal to the container unit receiving portion 210. The reader 240 is arranged to be in proximity to a machine-readable marker 140 of a container unit 100 received in the container unit receiving portion 210. In this example, the reader 240 includes an RF field reader 240 configured to apply an RF field to a machine-readable marker 140 of a container unit 100 in the container unit receiving portion 210, and to detect a resulting RF field from the machine-readable marker 140. The reader 240 is configured to obtain data from a machine-readable marker 140 of a container unit 100 which is indicative of at least one of: (i) the type of body tissue being stored in the container unit 100, (ii) parameters for the storage and/or preservation of said body tissue, and (iii) data indicative of one or more properties of the container unit 100 itself.

The reader 240 is configured to transmit a first authentication signal to the machine-readable marker 140, and in response, to detect a second authentication signal from the machine-readable marker 140. Based on this exchange, the reader 240 is configured to establish a secure connection with the machine-readable marker 140. The reader 240 is configured to then transmit a data request signal to the machine-readable marker 140, where that data request signal includes a header comprising a request for specific data input from the container unit 100. In response, the reader 240 is configured to receive a data response signal from the container unit 100 containing one or more of the requested data items included in the data request signal.

The display screen 260 is configured to display one or more output values from the system. The display screen 260 is configured to output sensor 256 measurement values. The display screen 260 is configured to provide an output to facilitate user input, such as to enable a user to use the display screen 260 to input data for controlling the storage and/or preservation of body tissue in the container unit 100.

The controller 250 is configured to receive an indication of sensor data from the sensor 256 and to control operation of the controllable valve 254. The controller 250 is configured to control the output provided to the display screen 260 and to receive data obtained using the reader 240. The data store 252 of the controller 250 includes a stored association between: (i) data indicating a type of body tissue in the container unit 100, and (ii) at least one operational parameter for the storage and/or preservation of body tissue in the container unit 100.

In this example, the container unit 100 is configured to transmit an indication of the body tissue contained in the container unit 100. The stored association in the data store 252 provides a mapping between: (i) a plurality of types of body tissue and (ii) pressure values for preservation fluid to be applied to each type of body tissue. The pressure values include a range of values corresponding to acceptable fluid pressures to be provided to the body tissue. This includes pressure thresholds for minimum and/or maximum fluid pressure values. This also includes alert data identifying pressure values at which alerts are output.

The processor 251 is configured to obtain body tissue data identifying the type of body tissue in the container unit 100 from the reader 240. The processor 251 is then configured to identify stored data indicating pressure values for preservation fluid to be applied to the type of body tissue in the container unit 100. The processor 251 is configured to provide an indication of this data on the display screen 260. The processor 251 is configured to set the acceptable range of pressure values, and the pressure values at which alerts are output, based on the stored data corresponding to the type of body tissue in the container unit 100.

The processor 251 is configured to receive fluid pressure data from the sensor 256. The processor 251 is configured to process this data based on the acceptable range of pressure values (and the pressure values at which alerts are output), and to control operation of the controllable valve 254 based on both the obtained pressure and the acceptable range of pressure values. The processor 251 is configured to control operation of the controllable valve 254 so that the fluid pressure remains in the range of acceptable fluid pressures. In the event that fluid pressure starts getting too high (based on the acceptable range), the processor 251 is configured to control the valve 254 to reduce the flow of fluid through the outlet 230, and in the event that the fluid pressure starts getting too low (based on the acceptable range), the processor 251 is configured to control the valve 254 to increase the flow of fluid through the outlet 230.

Figure 3:
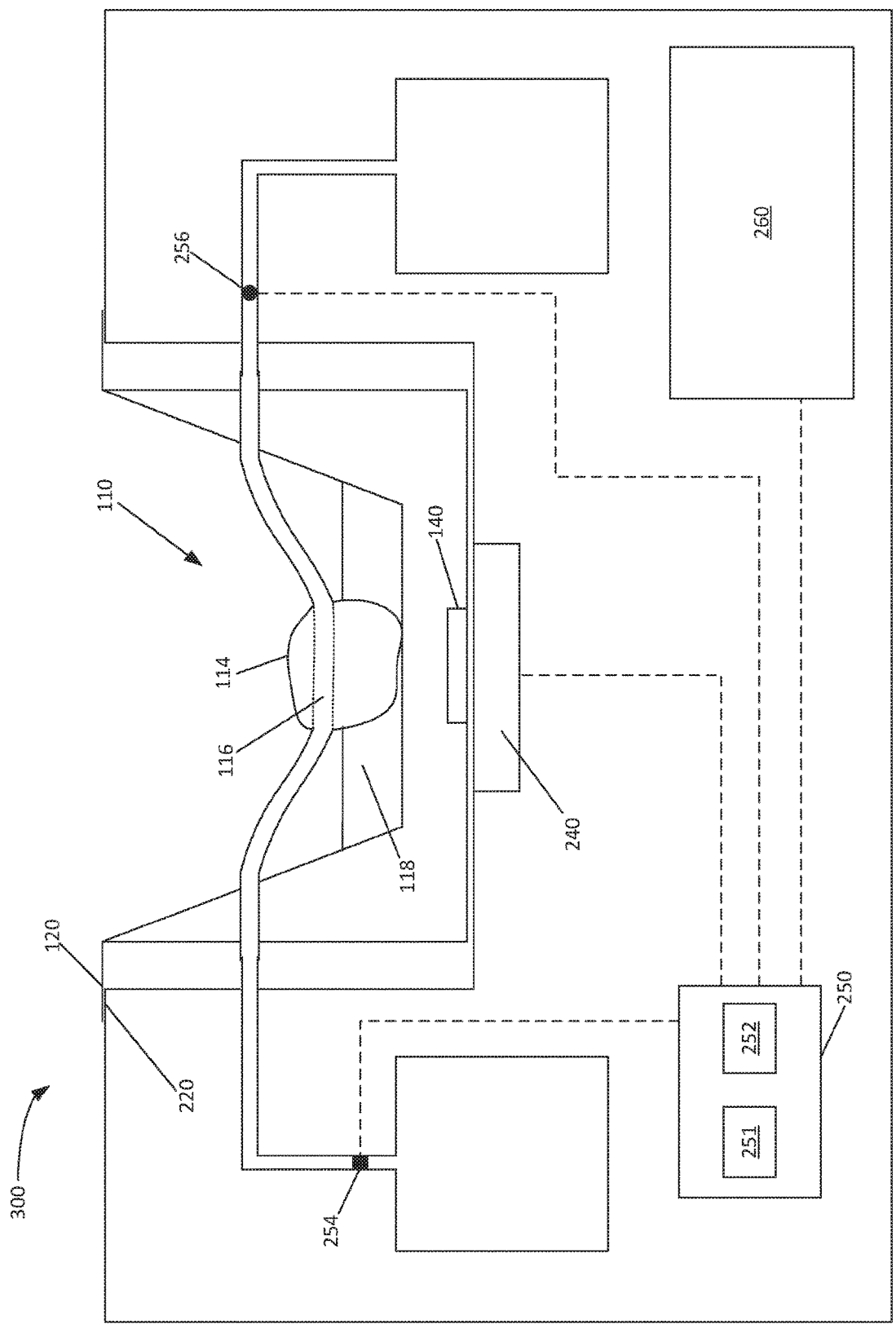
FIG. 3 is a schematic diagram of an example body tissue preservation system.

FIG. 3 shows an assembled body tissue preservation system 300. The body tissue preservation system 300 includes both a container unit 100 (as shown in FIG. 1) and a base unit 200 (as shown in FIG. 2).

In addition to the features described above with reference to FIGS. 1 and 2, FIG. 3 also includes a body tissue 114 having at least one lumen 116 stored in the container unit 100. The body tissue 114 is resting on a bottom surface of the body tissue receiving portion 110 of the container unit 100, and the body tissue 114 is at least partially immersed in a preservation fluid 118.

When assembled, the container unit 100 is inserted into the container unit receiving portion 210 of the base unit 200. The flange 120 of the container unit 100 is resting on the connection surface 220 of the base unit 200. The outlet 230 of the base unit 200 is connected to the inlet 130 of the container unit 100, and the outlet 134 of the container unit 100 is connected to the inlet 130 of the base unit 200. The first and second channels of the container unit 100 are connected to the lumen 116 of the body tissue 114. A fluid flow path is defined from the first fluid store 236 through the outlet 230 of the base unit 200 into the inlet 130 of the container unit 100, through the first channel 131 and into the lumen 116 of the body tissue 114, out into the second channel 132, through the outlet 134 of the container unit 100 into the inlet 234 of the base unit 200, and into the second fluid store 238.

When the container unit 100 is inserted into the container unit receiving portion 210 of the base unit 200, the machine-readable marker 140 is located within reading distance of the reader 240 to enable the exchange of data between the reader 240 and the machine-readable marker 140 (as described above). The machine-readable marker 140 is located adjacent to the reader 240. The machine-readable marker 140 is located directly above the reader 240. The size and/or shape of either the container unit 100 and/or the base unit 200 is selected to facilitate this arrangement.

With the body tissue 114 stored in the container unit 100, and the container unit 100 inserted into the base unit 200, the preservation system 300 is configured to store and/or preserve this body tissue 114. The system 300 is configured to control the application of preserving fluid to the body tissue 114 and/or to control one or more environmental parameters for the body tissue 114 in the container unit 100. This storage and/or preservation is controlled based on the data exchanged between the machine-readable marker 140 and the reader 240.

Figure 4:
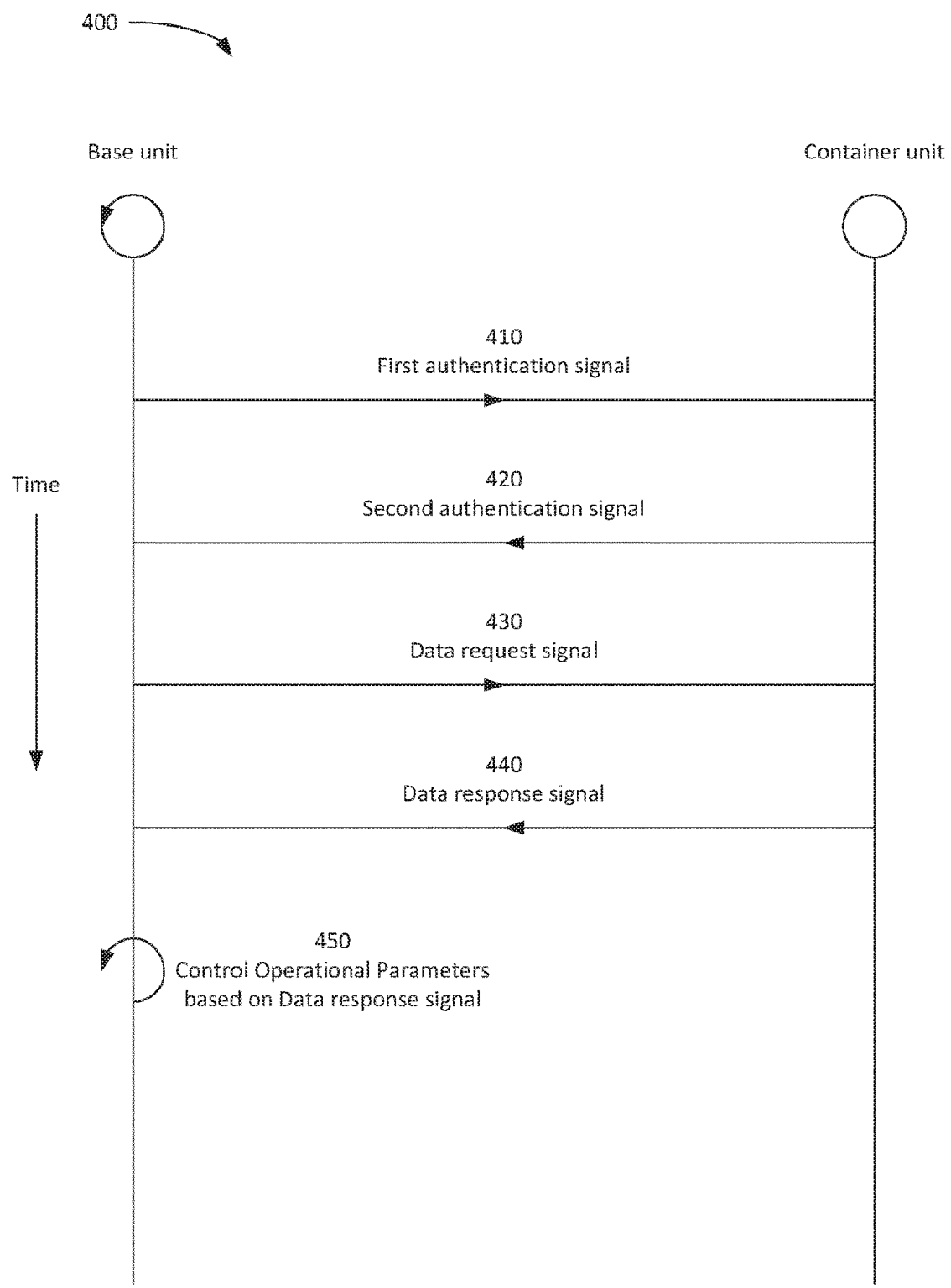
FIG. 4 is a timing diagram for an exemplary communication protocol between a base unit and a container unit.

The operation of the body tissue preservation system 300 is described in more detail with respect to FIG. 4.

FIG. 4 shows an exemplary timing diagram for a communication protocol between the base unit 200 and the container unit 100. FIG. 4 shows a method 400 of establishing authenticated communication between the base unit 200 and the container unit 100.

At step 410, the base unit 200 transmits a first authentication signal to the container unit 100. That is, the reader 240 of the base unit 200 transmits a first applied RF field to the machine-readable marker 140 of the container unit 100. The first authentication signal comprises a base unit nonce. The base unit nonce is a cryptographic nonce to be used in establishing authenticated communication. The first authentication is digitally signed by the base unit 200. The first authentication signal is received at the container unit 100. The first authentication signal may include a base unit public key, or the container unit 100 may include stored data indicative of the base unit public key. The first authentication signal may be encrypted using a container unit public key, and the container unit 100 may decrypt the first authentication signal using a container unit public key.

At step 420, the container unit 100 sends a second authentication signal to the base unit 200. That is, the machine-readable marker 140 of the container unit 100 transmits a second applied RF field to the reader 240 of the base unit 200. To send the second authentication signal, the container unit 100 responds to the first authentication signal by replying with the second authentication signal, which includes a container unit nonce digitally signed by the container unit 100. The second authentication signal also includes operation timing data for the container unit 100. The timing data includes an indication of at least one of: (i) a minimum time window for use of the container unit 100, (ii) a maximum time window for use of the container unit 100, and (iii) an expected time window for use of the container unit 100. The timing data is also digitally signed by the container unit 100. This data is transmitted to the base unit 200 in the second authentication signal. The second authentication signal is received at the base unit 200. The second authentication signal may include a container unit public key, or the base unit 200 may include stored data indicative of the container unit public key. The second authentication signal may be encrypted based on the base unit public key and the base unit may use its base unit private key to decrypt the data in the second authentication signal.

At step 430, the base unit 200 sends a data request signal to the container unit 100. To do this, the base unit 200 responds to the second authentication signal by providing a request for data from the container unit 100, where the request for data is digitally signed by the base unit 200. The request for data comprises a request for an indication of at least one operational parameter for the storage and/or preservation of body tissue 114 in the container unit 100. In this example, the request for data comprises a request for the container unit 100 to specify what type of body tissue it is carrying. This request is digitally signed by the base unit 200, before being cyphered according to the container unit public key. This encrypted data is then transmitted to the container unit 100 in the data request signal. The data request signal is received at the container unit 100, which uses its private key to decrypt the data in the data request signal.

At step 440, the container unit 100 sends a data response signal to the base unit 200. To do this, the container unit 100 responds to the data request signal by sending providing an indication of the operational parameter asked for by the base unit 200. In this example, the operational parameter is an indication of the type of body tissue in the container unit 100 (e.g. heart or lung). This data indicating the operational parameter is digitally signed by the container unit 100, then cyphered using the base unit public key. This encrypted data is then transmitted to the base unit 200 in the data response signal. The data response signal is received at the base unit 200, which uses its private key to decrypt the data in the data response signal.

The digital signatures provided in signals from the container unit 100/base unit 200 are checked by comparison to the previously established digital signatures. This may ensure that the two devices are the same throughout the communication protocol. In the event that either signature changes, the method may stop to prevent transmission of secure data to an unwanted entity.

At step 450, the base unit 200 has now received an indication for an operational parameter for the storage and/or preservation of the body tissue 114 in the container unit 100. In this example, the obtained indication comprises an indication of the type of body tissue in the container unit 100. The base unit 200 has also received an indication of timing data for the container unit 100. The timing data and tissue type are used to control the storage and/or preservation of the body tissue 114 in the container unit 100.

The timing data provides an indication of a window for use for the container unit 100. The base unit 200 is configured to prevent the same container unit 100 being used multiple times. To do this, the base unit 200 determines based on the timing data, whether or not the container unit 100 has been used previously. Although not shown as a method step in FIG. 4, during the exchange protocol, the base unit 200 may write data to the container unit 100 to indicate a time at which use of the container unit 100 for storage/preservation of body tissue has started. Based on a time delay since the container unit 100 first being used and the current time, the base unit 200 determines whether or not the container unit 100 has been used previously. In the event that it is determined that the container unit 100 has been used previously, operation is stopped to prevent the same container unit 100 being used twice (this may help to avoid contamination from earlier body tissue). In the event that it is determined that the container unit 100 has not been used previously, the base unit 200 proceeds to select the operational parameters for the storage and/or preservation of the body tissue 114 in the container unit 100.

To select the operational parameters, the controller 250 identifies data in the data store 252 which corresponds to the type of body tissue indicated in the data response signal. The data store 252 stores data which provides one or more operational parameters for the storage and/or preservation of different types of body tissue. The operational parameters associated with the relevant body tissue are identified. For the example system 300 shown in FIG. 3, the data store 252 includes pressure data for each body tissue type. The pressure data provides an indication of minimum and maximum fluid pressures for preservation fluid flowing through the body tissue.

During storage and/or preservation of body tissue in the container unit 100, preservation fluid is delivered to the body tissue using the first passageway, the lumen 116 and the second passageway. This process is controlled based on sensor data indicating fluid pressure. The process is controlled base on the minimum and maximum pressure values obtained from the data store 252. This includes inhibiting operation of the system 300 at pressure values which are too high/low. This also includes preventing a user of the system 300 from inputting incorrect data for pressure values (e.g. to prevent a user from selecting a pressure value using the display screen 260, where that pressure value is not between the minimum and maximum pressure values). A feedback loop between the controller 250, the controllable valve 254 and the sensor 256 is maintained so that the operation of the valve 254 (e.g. how much fluid to let flow into the body tissue) is selected based on the obtained pressure valves from the sensor 256.

It will be appreciated in the context of the present disclosure that the exemplary system and method described above may enable greater reliability in the selection of operational parameters for the storage and/or preservation of body tissue. This may reduce human error associated with the process, and may also increase speed of operation, as fewer details may need to be input. This may provide an easy to use system for the storage and/or preservation of body tissue where some details relevant to the operation of the system are seamlessly obtained. However, it will also be appreciated that the system and method described above is one specific example. This example is not to be considered limiting.

Features described in this example are not necessarily essential, and systems and methods of the present disclosure may be provided without these features. Likewise, additional and/or alternative features may be provided. The following description is of some of these additional features or alternative arrangements.

Body Tissue Preservation System

The body tissue preservation system 300 includes a container unit 100 and a base unit 200. The container unit 100 is configured as an insert for the base unit 200. The container unit 100 may be sized and/or shaped according to a standard to facilitate insertion into the base unit 200. Each container unit 100 may be specific to a type of body tissue it is intended to be used with. For example, the container unit 100 may be of a selected size to receive its intended body tissue and/or the container may have a number of inlets and outlets depending on the intended body tissue (e.g. to provide preservation fluid to the correct number of lumens within the body tissue). The container unit 100 may comprise a restraint to secure a body tissue within the body tissue receiving portion 110 of the container unit 100 (e.g. to inhibit movement of the body tissue during transport).

The body tissue preservation system 300 may be for use for storage and/or transport of body tissue. The body tissue may comprise an organ. For example, the system 300 may be arranged for storage and/or transport of organs to be used for organ transplants. The system 300 may be arranged to store and preserve the organ for an amount of time from that organ being harvested to the organ being ready for transplant into a patient. Container units may be organ specific. Each container unit may comprise one or more indicia to indicate which type of organ that container unit is for (e.g. they may be colour-coded). The machine-readable marker 140 of the container unit may correspond to the type of organ for which that container unit is intended to carry.

Storage and/or preservation of body tissue in the system 300 may comprise storing the body tissue for a selected time period (e.g. associated with an amount of time between that body tissue being harvested and being ready for that tissue to be transplanted into a patient). Storing the body tissue for this selected time period may comprise controlling one or more properties of the body tissue and/or its surrounding environment for preservation of the body tissue. Preserving the body tissue may comprise retaining the body tissue in a suitable condition for implant into a patient (e.g. after the selected time period has elapsed). For example, preserving the body tissue may comprise inhibiting damage to the tissue after the tissue has been removed from a patient, and prior to that tissue being re-inserted to a patient. Preserving body tissue may comprise perfusing body tissue.

The storage and/or preservation system 300 may comprise an organ preservation system, such as an extracorporeal tissue storage and/or preservation system (e.g. an ex vivo/ex situ system). The system 300 may be configured to deliver one or more fluids to body tissue carried in the container unit 100. These fluids may comprise preservation fluids, and may be passed through one or more lumens of the body tissue to facilitate preservation of the body tissue. The system 300 may be configured for gaseous and/or liquid perfusion of the body tissue in the container unit 100. For example, the system 300 may be configured for one or more of: (i) normothermic liquid perfusion, (ii) hypothermic liquid perfusion, and (iii) persufflation, of the body tissue in the container unit 100.

The storage and/or preservation system 300 may comprise a body tissue persufflation system. The body tissue persufflation system may be configured to deliver one or more persufflation fluids to lumens of the body tissue. Persufflation fluids may be delivered in either a retrograde or anterograde manner. For anterograde persufflation, persufflation fluid (e.g. a persufflation gas) is delivered into the body tissue through one or more arteries, and is taken out of the body tissue from one or more veins (e.g. the flow of persufflation fluid enters through the artery and is drained through the vein). For retrograde persufflation, holes are pricked in the body tissue, and a persufflation fluid is delivered to the veins of the body tissue, and exits through the pricked holes. The persufflation fluid may comprise any suitable persufflation fluid configured to deliver oxygen to the body tissue, e.g. a persufflation gas with an oxygen level high enough to sustain the body tissue.

The container unit 100 may be a disposable (e.g. to prevent contamination of a later body tissue by an earlier body tissue carried by the container unit 100). The container unit 100 may comprise one or more base unit 200 connectors to facilitate connection of the container unit 100 to the base unit 200. For example, the container unit 100 may comprise one or more flanges arranged to mate with a corresponding component of the base unit 200. The container unit 100 may store a pool of preservation fluid in the body tissue receiving portion 110, e.g. so that a body tissue stored in the container unit 100 is at least partially submerged in the preservation fluid. The machine-readable marker 140 of the container unit 100 may be located in a region of the container unit 100 away from the pool of preservation fluid, such as to one side of the container unit 100 and/or in a flange 120 extending away from the container unit 100.

The base unit 200 may comprise a source of preservation fluid, such as a canister of persufflation gas. The base unit 200 may be configured to be connected to the container unit 100 to supply this preservation fluid to the body tissue in the container unit 100, such as to provide a fluid flow path for preservation fluid to arteries and/or veins of the body tissue. The base unit 200 may be configured to control delivery of this preservation fluid to the body tissue. The base unit 200 may also be configured to regulate a temperature/pressure of the environment of the body tissue in the container unit 100. For example, a heater may be provided which is operable to raise the heat (and/or pressure) in the container unit 100, and/or a cooling device may be provided to reduce heat (and/or pressure) in the container unit 100.

Machine-Readable Marker

The container unit 100 comprises one or more machine-readable markers. Although described above as an RF transceiver, other suitable types of machine-readable marker may be used. Examples of suitable machine-readable markers may include QR codes, bar codes, RFID (e.g. NFC) devices or any other suitable capacitive and/or inductive coupling.

The machine-readable marker 140 is configured to enable a reader 240 to determine therefrom one or more properties of the container unit 100 and/or the body tissue in the container unit 100. The machine-readable marker 140 may be configured to provide an indication of the type of body tissue (e.g. to enable the controller 250 to identify the relevant operational parameters based on the type of body tissue). The machine-readable marker 140 may be configured to provide an indication of operational parameters for the body tissue (e.g. to enable the controller 250 to select operational parameters accordingly, such as without ever receiving knowledge of what type of body tissue is being stored). The machine-readable marker 140 may be configured to provide both an indication of the type of body tissue and one or more operational parameters for the storage and/or preservation of that body tissue.

The machine-readable marker 140 may be configured to provide an indication of one or more properties of the container unit 100 itself. The machine-readable marker may be configured to provide an indication of the intended use for the container unit. For example, where the container unit 100 may be configured for use of one of anterograde and retrograde operation, the machine-readable marker 140 may be configured to provide an indication of which mode of operation to use. For example, this may itself provide an indication of the type of body tissue being stored (e.g. where the container unit 100 is specific for a certain type of body tissue). The indication of one or more properties of the container unit 100 may enable determination of whether or not that container unit 100 has previously been used. For example, the indication may comprise an indication of at least one of: (i) a timestamp at which that container unit 100 first registered with a base unit 200 (e.g. based on which it an expiration time for that container unit 100 may be determined due to that container unit 100 having previously been used), (ii) a expiration time for that container unit 100 (e.g. based on when it was manufactured), (iii) a counter indicating the number of times that container has been used, and (iv) identifier data for a version (product or model number) of that container unit 100 (e.g. to enable the controller to determine operational parameters for that container unit 100, such as whether or not that container unit 100 is compatible with the base unit 200). The machine-readable marker 140 may be configured to be marked in the event that a body tissue is placed in the container unit 100, where the marking is to provide an indication of the type of body tissue placed in the container unit 100.

Where the machine-readable marker 140 comprises an RF transceiver, the machine-readable marker 140 may include an antenna configured to transmit and/or receive RF radiation. The marker may comprise its own power store, or it may be configured to harvest all its power from incident RF radiation. For example, the machine-readable marker 140 may comprise power harvesting circuitry (e.g. which includes one or more diodes) to harvest power from the applied RF field. The harvested power may be used to produce an RF waveform which is modulated in some way to include the relevant data to be transmitted by the machine-readable marker 140. For example, one or more signal processing elements may be configured to apply data (e.g. in the form of selected pulses) to a carrier wave which is to be transmitted to the reader 240. The machine-readable marker 140 may include a component which stores the relevant data to be transmitted, as well as other communication data, such as a base public key and container unit public and private keys. Data in this component may be updated, e.g. to receive and store the base unit public key and/or to update a timestamp for the container unit 100 such as to indicate that the container unit 100 has been received in a base unit 200. The machine-readable marker 140 may comprise an RFID device.

Where RF fields are used, the reader 240 may be similar to the machine-readable marker 140 in that it may also comprise an antenna for transmitting and receiving RF radiation, as well as one or more signal processing elements for controlling the transmission of data, and a component for storing communication data such as public and private keys. Some or all of this storage may be provided by the data store 252 of the controller 250. The reader 240 may be connected to a power store to facilitate generation of such RF fields. The reader 240 may be bigger than the machine-readable marker 140 of the container unit 100 to facilitate connection with the machine-readable marker 140 over a wider area. The base unit 200 may be arranged to receive the container unit 100 in such a way that the machine-readable marker 140 is located adjacent the reader 240, such as within a threshold distance of the reader 240, e.g. to enable the reader 240 to interact with the machine-readable marker 140 as required.

Controlling Operational Parameters

The controller 250 is configured to control one or more operational parameters of the storage and/or preservation of the body tissue in the container unit 100 based on data obtained from the machine-readable marker 140 of the container unit 100. It will be appreciated in the context of the present disclosure that any suitable data may be obtained from the machine-readable marker 140, and any suitable operational parameter may be controlled accordingly.

Controlling an operational parameter may comprise controlling a parameter associated with fluids supplied to the body tissue and/or a parameter for the environment of the body tissue in the container unit 100. Controlling a parameter for the environment of the body tissue may comprise controlling one or more of: a temperature, a pressure, an oxygen concentration and/or a humidity of the environment of the body tissue, e.g. within the body tissue receiving portion 110 of the container unit 100. Controlling a parameter associated with a fluid supplied to the body tissue may comprise controlling one or more of: a pressure of fluid supplied, a temperature of fluid supplied, a flow rate of fluid supplied, a number of active lines for the supply of fluid (e.g. a number of first channels to provide fluid to the body tissue), which particular fluid is supplied, and/or through which channels the fluid is to be supplied to the body tissue.

Controlling an operational parameter may comprise controlling timing for the storage and/or preservation of the body tissue. The operational parameter may comprise an indication of a duration for which the body tissue is to be stored and/or preserved. For example, the operational parameter may provide an indication of a duration of time for which fluid is to be applied to the body tissue. In the event that the duration of time is determined to have expired, the controller 250 may inhibit delivery of fluid to the body tissue. For example, if the container unit 100 has been used previously (and/or first registered with the base unit 200 more than a threshold amount of time ago), the controller 250 may inhibit any further operation of storing and/or preserving the body tissue.

Time bombing functionality may be used in which an allowable time window is defined for the use of the container unit 100. Such time bombing functionality may comprise setting timing restraints for when the container unit may be used (e.g. one or more time periods in which the container unit may be used, and/or one or more time periods in which the container unit may not be used). When the machine-readable marker 140 of the container unit 100 and the base unit 200 first interact, a time stamp for when this interaction occurred may be stored. This may be stored in the base unit 200 and/or it may be stored in the machine-readable marker 140. Based on this time stamp, a time window may be defined for which the container unit 100 may be used. Once this time window expires, the container unit 100 may no longer be used. Based on this time window/time stamp, it may be determined whether or not the container unit 100 may be used. In the event that the current time is within a threshold period of time from the time stamp (e.g. the current time is within the time window), it may be determined that the container unit 100 may be used. For example, if the container unit 100 were to be switched to a different base unit 200, or if the base unit 200 were to lose connection with the container unit 100, it may still be determined that although that container unit 100 has been time stamped, it is still suitable for use (as an insufficient amount of time has passed). Time bombing functionality may be based on absolute or relative timing. For example, timing may be based on elapsed time (such as use of a ticker to determine elapsed time since a particular event), and/or timing may be based on absolute time (e.g. time of day). Time bombing functionality may provide a set time at which operation of the system should change (e.g. stop storage and/or preservation at 12:45) and/or this may provide a relative time (e.g. stop storage and/or preservation in 45 minutes).

Time bombing functionality may be established after the mutual-authentication, such as after the first and second authentication signals. For example, once the authentication process has been completed, and the authorisation protocol followed, further signals transmitted between the container unit 100 and base unit 200 may facilitate time bombing functionality. This may include refusal to work outside certain time periods, e.g. these time periods may be set based on the time associated with the authorisation between the container unit 100 and base unit 200.

The reader 240 may be configured to store an indication of time stamp data for container units (e.g. in the data store 252). The reader 240 may be configured to mark an indication of this time stamp to the machine-readable marker 140. In either case, other base units may be able to determine whether or not the time window for use of that container unit 100 has passed (e.g. by connecting to a data store 252 where time stamp data for container units is stored and/or by identifying a time stamp marked on the machine-readable marker 140 of the container unit 100). Controlling an operational parameter of the storage and/or preservation of body tissue in the container unit 100 based on data obtained from the machine-readable marker 140 may comprise obtaining an indication of the time stamp for the container unit 100 and determining whether or not to permit use of the container unit 100.

Controlling an operational parameter of the storage and/or preservation of body tissue may comprise controlling an output to the display screen 260 and/or restricting inputs from a user of the system 300. For example, a number of operational parameters may be displayed to the user using the display screen 260, and which parameters are displayed may be determined based on the obtained data from the machine-readable marker 140, e.g. so that available input options conform to requirements for the relevant type of body tissue. The controller 250 may be configured to inhibit input data from a user which does not conform to requirements for the relevant type of body tissue. For example, if the user tries to input a parameter value not falling in a selected range associated with the relevant type of body tissue, the controller 250 may issue an alert and/or prevent this input data from being applied. Controlling operational parameters may comprise only allowing operational parameters to be selected (e.g. by a user) which are consistent with data obtained from the machine-readable marker 140.

The data obtained from the machine-readable marker 140 may comprise identifier data. For example, the identifier data may provide an indication of a date or model number associated with that container unit 100. The controller 250 may control operation based on this identifier data. For example, different container units (from different batches) may have to be controlled in a different way, e.g. they may have certain input characteristics etc. The controller 250 may control operation based on the requirements for each type of container unit, such as to control number of input channels to the container unit 100. Controlling the at least one operational parameter may comprise using the machine-readable marker 140 and reader 240 to establish that the container unit 100 is correctly inserted into the base unit 200. In the event that it is determined that the container unit 100 is correctly inserted in the base unit 200, the controller 250 may enable storage and/or preservation of body tissue to commence and/or in the event that it is determined that the container unit 100 is not correctly inserted, the controller 250 may inhibit storage and/or preservation of the body tissue.

Container Unit Base Unit Communication Protocol

The reader 240 is configured to obtain data from the machine-readable marker 140, and to control at least one operational parameter of the storage and/or preservation of the body tissue based on the obtained data. It is to be appreciated in the context of the present disclosure that this data may be obtained in a number of ways. The specific way in which data is obtained may depend on the data to be transmitted and/or the type of machine-readable marker 140 and reader 240 to be used. The machine-readable marker 140 may be configured to enable at least one of the following to be obtained therefrom: (i) data, based on which, the controller 250 may determine one or more operational parameters to select, (ii) data which instructs the controller 250 as to one or more operational parameters to select. The controller 250 may be configured to obtain an indication of a type of body tissue in the container unit 100, or properties of the container unit 100 itself such as identifier data or expiration data, based on which the controller 250 may be configured to determine which operational parameters to select. The controller 250 may configured to obtain an indication of one or more operational parameters to be selected, and the controller 250 may be configured to select those operational parameters accordingly.

The reader 240 is configured to transmit at least one signal including a data request. The data request may include requests for one or more items of data. The items of data requested in the data request may be selected depending on whether the container unit 100 is configured to transmit data indicative of the container unit 100 itself/the type of body tissue it is carrying and/or operational parameters. For example, the request may be a request for at least one of: (i) a container ID, (ii) any time stamp data or time window/expiration data for that container unit 100, (iii) a type of body tissue carried by the container unit 100, and/or (iv) identifier data for a version (product or model number) of that container unit 100 (e.g. to enable the controller to determine operational parameters for that container unit 100, such as whether or not that container unit 100 is compatible with the base unit 200). The request may be a request for at least one operational parameter to be used for the storage and/or preservation of that body tissue, such as: (i) a fluid pressure, (ii) a fluid flow rate, (iii) a fluid temperature, (iv) an ambient temperature/pressure/oxygen concentration/humidity, (v) a number of active lines to be used for delivering fluid to the body tissue, and/or (vi) a particular type of fluid to be used. The data request may comprise a header which includes a request for one or more of the types of data set out above. For example, the data request may be for a type of body tissue, and pressure and/or flow rate data for that body tissue.

The transfer of data between machine-readable marker 140 and reader 240 may be encrypted, such as using public-private key encryption. The transfer process may include sharing of one or more keys to enable a public-private key encryption for data transferred between the container unit 100 and base unit 200. The transfer process may include use of one or more digital signatures, to enable verification that the same devices are present as when the transfer protocol was initiated and/or that data was accurate at the point of signing. One or more nonces may be shared between the machine-readable marker 140 and the reader 240. For example, sharing nonces may enable identification of re-used communications, such as those associated with containers which may have been used previously. The container unit 100 and/or base unit 200 may have associated encryption keys. For example, there may be a container unit encryption key, such as a public-private key arrangement, for which the base unit 200 may have a container unit encryption key and the container unit 100 may have a private container unit decryption key. There may be a base unit encryption key, such as a public-private key arrangement, for which the container unit 100 may have a base unit encryption key and the base unit 200 may have a private base unit decryption key. Each of the container unit and the base unit may use their respective key to decrypt received signals, and may use the relevant key to encrypt signals they then transmit. The encryption keys may be exchanged between the container unit and the base unit (e.g. as part of an authorisation exchange, or prior to the first and second authorisation signals), or the container unit/base unit may include stored data for these keys.

Once an authenticated communication channel is established, the reader 240 may call for the data it wants to receive from the container unit 100, and the container unit 100 may respond by providing an indication of this data.

Alternatives, Variants and/or Additional Features

In examples described above, the controller 250 has been provided in the base unit. However, it is to be appreciated in the context of the present disclosure that this arrangement should not be considered limiting. For example, the controller 250 may be provided by a separate entity, and the base unit may include a communications interface for communication with the controller 250. In examples, the controlling of at least one operational parameter has included controlling operation of a feature of the base unit (such as a controllable valve 254). However, it is to be appreciated in the context of the present disclosure that this arrangement should not be considered limiting, as components in the container unit or a separate entity may be controlled to control the at least one operational parameter of the storage and/or preservation of body tissue in the container unit.

Figure 5:
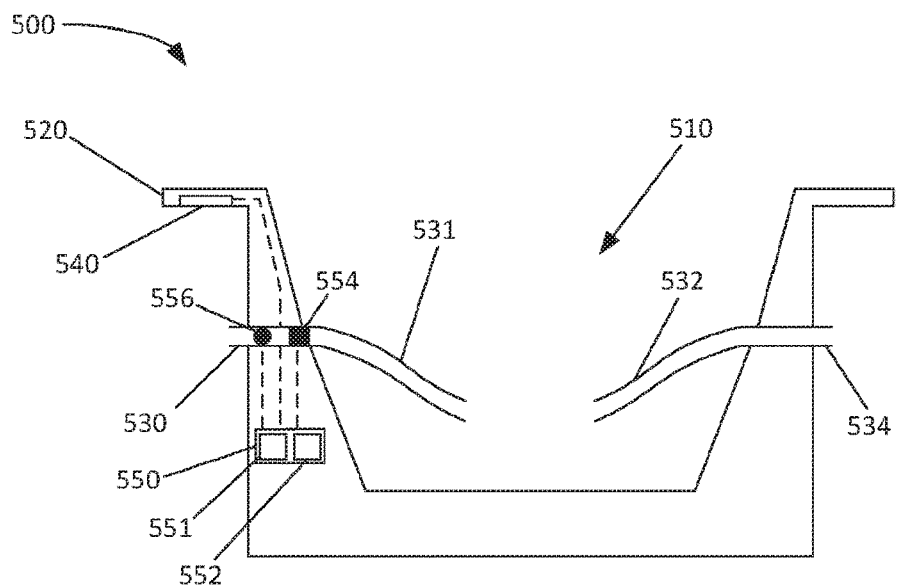
FIG. 5 is a schematic diagram of an example container unit.
Figure 6:
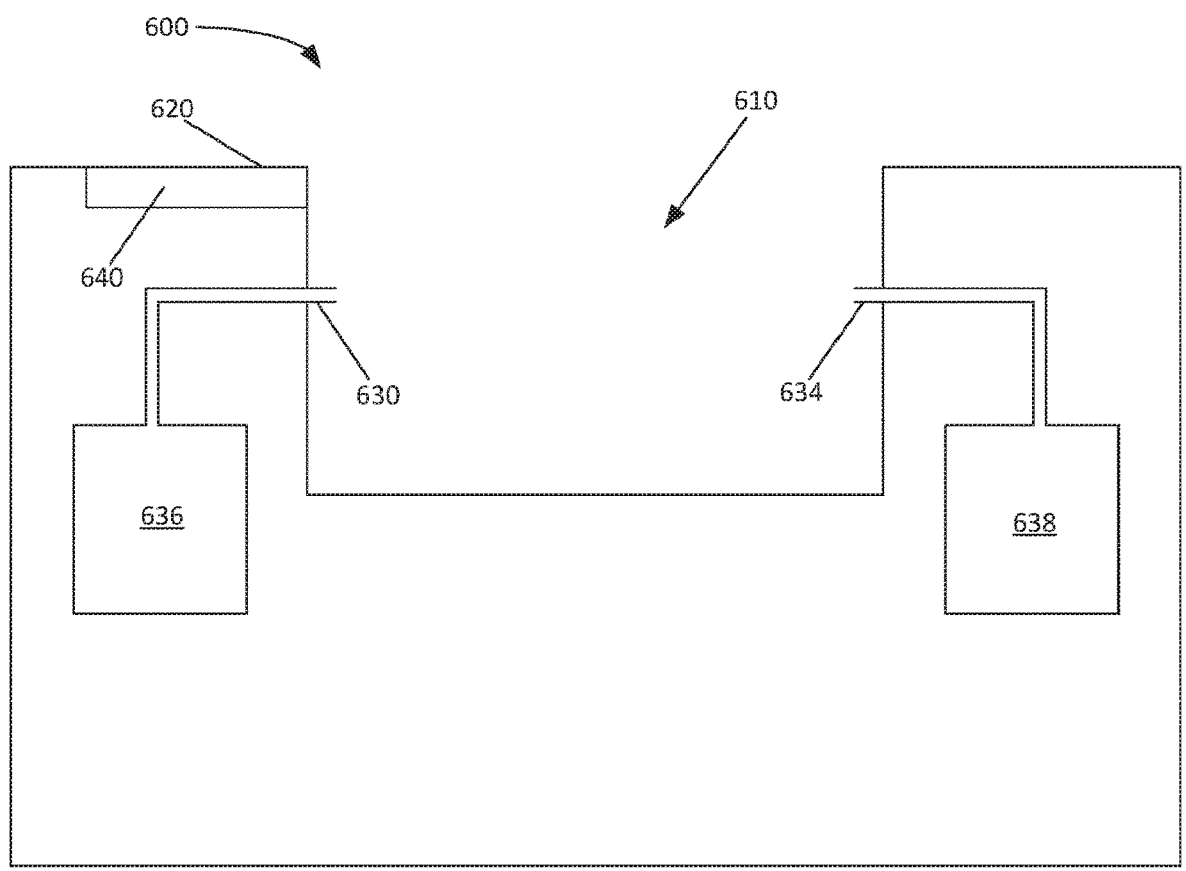
FIG. 6 is a schematic diagram of an example base unit.

One example of such an arrangement is shown in FIGS. 5 and 6.

FIG. 5 shows a schematic diagram of an example container unit 500, and FIG. 6 shows a schematic diagram of an example base unit 600.

The container unit 500 includes a number of similar components to those described above, and so these components will not be described in detail again. These include a body tissue receiving portion 510, the inlet 530, the outlet 534, and the first and second channel 531, 532. Likewise, the base unit 600 includes a container unit receiving portion 610, a connection surface 620, a first fluid store 636, a fluid outlet 630, a fluid inlet 634 and a second fluid store 638.

The container unit 500 also includes a flange 520, a machine-readable marker 540, a controller 550, a controllable valve 554 and a sensor 556. The controller 550 includes a processor 551 and a data store 552. The machine-readable marker 540 is located away from the body tissue receiving portion 510. The flange 520 comprises the machine-readable marker 540. Each of the controllable valve 554 and the sensor 556 are provided in the inlet 530. The controller 550 is connected to each of the machine-readable marker 540, the sensor 556 and the controllable valve 554. The base unit 600 also includes a reader 640. The reader 640 is arranged in the connection surface 620 of the base unit 600.

The controllable valve 554 is configured to control an amount of fluid flow through the inlet 530 into the first channel 531. The sensor 556 is configured to obtain sensor measurements for fluid in the inlet 530. The controller 550 is configured to obtain data from the machine-readable marker 540, and the sensor 556 and to control operation of the controllable valve 554 accordingly. It is to be appreciated that the function of the individual components may correspond to the functionality described above. However, in this example, the majority of the controlling is performed within the container unit 500 rather than the base unit 600.

In operation, the container unit 500 is inserted into the base unit 600. When inserted, the machine-readable marker 540 in the flange 520 is located adjacent the reader 640 in the connection surface 620. The fluid outlet 630 of the base unit 600 is connected to the inlet 530 of the container unit 500, and the outlet 534 of the container unit 500 is connected to the fluid inlet 634 of the base unit 600. The reader 640 is configured to interact with the machine-readable marker 540 to establish that preservation of the body tissue in the container unit 500 is to commence (for example, this may comprise identifying that the container unit 500 is correctly inserted into the base unit 600, or it may comprise an indication of which preservation fluid to apply). Preservation fluid from the base unit 600 may then be delivered to the container unit 500.

The controller 550 of the container unit 500 may operate to control the delivery of preservation fluid to the body tissue. This may occur in a manner similar to that described above, e.g. that the controller 550 obtains a sensor measurement for fluid pressure and controls operation of the controllable valve 554 based on this obtained measurement. This may occur without transmission of data indicative of operational parameters and/or of the type of body tissue contained in the container unit 500. The interaction between the reader 640 and machine-readable marker 540 may enable data to be transmitted based on which at least one operational parameter is controlled, such as to establish the container unit 500 is inserted correctly and/or to commence delivery of preservation fluid. This may happen without transmission of data about the body tissue itself, and instead data transmitted may be instructions to initiate an action at the base unit 600.

It is to be appreciated in the context of the present disclosure that the machine-readable marker may be included at any suitable location in the container unit. This may include being embedded within the container unit and/or located on a internal or external surface of the container unit. The machine-readable marker may be located on the underside of the container unit. It may be located on a side of the container unit which faces the base unit when inserted into the base unit, or it may located within a surface that is proximal to a portion of the base unit when inserted, e.g. in a surface which is inserted into the base unit. The machine-readable marker may be located centrally within the container unit or it may be located radially outwards from the centre. In examples described herein, the container unit includes a machine-readable marker and the base unit includes a reader. The container unit may additionally or alternatively include the reader, and the base unit may include the machine-readable marker. For example, the container unit may be responsible for transmitting the first transmission signal and the data request signal, and the base unit responsible for transmitting the second transmission signal and the data response signal.

In examples described herein, fluid flow paths between the base unit and the container unit are described. It is to be appreciated in the context of the present disclosure that the flow paths discussed are merely exemplary. For example, the base unit may contain a source of preservation fluid, and one or more flow paths may be defined to enable that preservation fluid to be delivered to the body tissue. The flow path may go through an inlet in the container unit, or tubes may be provided which may pass over the sides of the container unit and into the body tissue receiving portion. A plurality of fluid flow paths may be provided to enable preservation fluid to be delivered to the body tissue in the container unit. For example, the container unit may be arranged to enable a plurality of first channels to be connected to the body tissue for the delivery of preservation fluid. The container unit may also not have an outlet. For example, where a gas is to be pumped into the body tissue, the gas may pass from the body tissue into the surrounding environment, e.g. and then out through a vent/filter to the atmosphere.

The container unit may include one or more fluid processing elements. The fluid processing elements may include a passageway sized and/or shaped to provide some processing of the fluid therein, such as to reduce bubble size, humidify and/or cool the fluid therein. These may be used to process incoming preservation fluid which is to be delivered to the body tissue. For example, the incoming preservation fluid may be a persufflation gas, and the fluid processing elements may process this fluid between being received at the inlet of the container unit and passing through the first channel into the body tissue.

Although examples have been described which include a flange, a flange may not be included. For example, the base unit may comprise an attachment for retaining the container unit within the container unit receiving portion of the base unit, such as a strap, hook or other attachment means to secure the container unit in place. The container unit may include a suitable attachment to ensure it is retained in the base unit. The container unit may be provided without any flange or attachment.

Examples described herein include a first and second fluid storage tank. However, it is to be appreciated that one or both of these may not be included. For example, the base unit may be configured to generate preservation fluid in situ. The first fluid store may be a gas canister storing persufflation fluid. The second fluid store may not be included, such as where the preservation fluid may be expelled from the container unit into the atmosphere, or where the fluid inlet of the base unit is connected to an expulsion portal for expelling/draining used preservation fluids. The preservation fluid may be recycled (e.g. cleaned and process to ensure the oxygen concentration is within a threshold level) within the base unit, e.g. to enable this preservation fluid to be re-delivered to the body tissue.

Some examples described herein include a controllable valve, which may be used to control the at least one operational parameter of the storage and/or preservation of the body tissue in the container unit. However, it is to be appreciated in the context of the present disclosure that any suitable component may be provided to facilitate control of at least one operational parameter of the storage and/or preservation of body tissue. For example, a heater/cooler may be include to regulate the temperature of preservation fluid and/or to regulate ambient temperature in the body tissue's environment. Other regulators may include an oxygen supply to regulate an oxygen concentration of preservation fluid, a selectable valve to control fluid flow from more than one fluid source (e.g. to select which fluid source(s) to use).

It is also to be appreciated in the context of the present disclosure that the location and type of sensor used is not to be considered limiting. For example, any suitable sensor may be used, such as a temperature sensor, a pressure sensor, a humidity sensor, an oxygen concentration sensor, a flow meter, and/or a turbidity sensor. Any suitable location for the sensor may be used, such as within the first fluid store, between the first fluid store and the fluid outlet of the base unit, in the inlet of the container unit, in the first channel, the second channel, the outlet 534 of the container unit, the fluid inlet of the base unit, between the fluid inlet and the second fluid store and/or in the second fluid store. The sensor may be located in the container unit environment, such as in a surface of, or inside, the body tissue receiving portion. The location and/or type of sensor is not to be considered limiting. The arrangement may be configured to enable one or more operational parameters of the system 300 to be monitored to enable some feedback control of that system 300. A sensor may not be used at all, such as when the machine-readable marker and reader interact to initiate delivery of preservation fluid.

It is to be appreciated in the context of the present disclosure that the machine-readable marker and the reader may comprise any suitable component configured to perform their functionality. For example, the machine-readable marker may comprise a first communications interface. The reader may comprise a second communications interface. It will be appreciated that any suitable component may be provided for the machine-readable marker and/or the reader.

The base unit may be configured continually (e.g. periodically) transmit first authentication signals, or to only transmit these signals after detecting the presence of a reader and/or after being turned on. Although the examples include a display screen 260 in the base unit, this not to be considered limiting, as no display screen 260 may be provided. The base unit may include a communications interface for communicating with a display screen 260 elsewhere, or no display screen 260 may be provided at all. For example, other means may be provided to enable a user to input data for the system 300 and/or the system 300 may be completely automatic (e.g. it may require no user input). Likewise, the controller may be located anywhere. For example, the container unit and/or base unit may include a communications interface for communicating with the controller. The controller could be provided by a cloud-based service and/or could be provided by one or both of the container unit and the base unit.

The at least one operational parameter may comprise any suitable parameter relevant to the storage and/or preservation of body tissue in the container unit. For example, this parameter may comprise an indication to start and or stop storage/preservation (e.g. to stop delivery of preservation fluid and/or regulation of ambient conditions in the environment of the body tissue). The operational parameter may comprise a target value for a parameter, or a range of values for a parameter such as intended minimum or maximum values for that parameter. Controlling the operational parameter may comprise controlling operation of the system 300 to retain the value for that parameter close to the target value and/or to retain that parameter within the intended range for the parameter. Controlling the operational parameter may comprise providing an alert once the parameter is different to the target value, and/or outside the selected range. For example, data obtained from the machine-readable marker may provide an indication of alert values to be used for the parameter (e.g. the values at which an alert/alarm is output, such as to indicate that the system 300 needs checking or that a property needs adjusting).

Controlling at least one operational parameter may comprise controlling input data applied to the system 300 and/or controlling output data displayed to the user (e.g. on the display screen 260). For example, this may comprise inhibiting (e.g. preventing) a user from initiating settings which involve parameters not within an acceptable range, and/or it may comprise providing a user a plurality of input options, where those input options are for parameter values falling within the intended range (e.g. but not values falling outside the range).

In examples described above, timing data is obtained in addition to data for controlling the operational parameters of the body tissue. However, it is to be appreciated in the context of the present disclosure that both types of data need not be obtained in combination. For example, based on the timing data, the controller may still control at least one operational parameter for the storage and/or preservation of body tissue. Likewise, an operational parameter may be controlled without any timing data. For example, the preservation fluid pressure may be regulated without knowledge of whether or not the container unit has been used for too long/used before. For example, whether or not to deliver preservation fluid to the body tissue may be controlled entirely based on timing data, e.g. if the container unit has been used before then no delivery, and if it has not been used before, then delivery. Identifier data may be used to enable identification of whether or not the container has been used, e.g. identifier data may be used to establish timing data. For example, the container unit may transmit identifier data based on which the base unit may establish relevant timing data, such as by retrieving this information from stored data (e.g. in the data store).

Examples described herein relate to the delivery of preservation fluid to the body tissue. However, it is to be appreciated in the context of the present disclosure that this is not to be considered limiting. For example, instead the ambient conditions in the environment of the body tissue may be controlled, such as to control a temperature and/or pressure. This may occur without delivery of a preservation fluid. In examples, digital signing of data may be used for signals transmitted between the container unit and base unit, but this is not to be considered limiting. For example, the units may not provide any digital signing of their transmission.

It will be appreciated from the discussion above that the examples shown in the figures are merely exemplary, and include features which may be generalised, removed or replaced as described herein and as set out in the claims. With reference to the drawings in general, it will be appreciated that schematic functional block diagrams are used to indicate functionality of systems and apparatus described herein. In addition the processing functionality may also be provided by devices which are supported by an electronic device. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some examples the function of one or more elements shown in the drawings may be integrated into a single functional unit.

As will be appreciated by the skilled reader in the context of the present disclosure, each of the examples described herein may be implemented in a variety of different ways. Any feature of any aspects of the disclosure may be combined with any of the other aspects of the disclosure. For example method aspects may be combined with apparatus aspects, and features described with reference to the operation of particular elements of apparatus may be provided in methods which do not use those particular types of apparatus. In addition, each of the features of each of the examples is intended to be separable from the features which it is described in combination with, unless it is expressly stated that some other feature is essential to its operation. Each of these separable features may of course be combined with any of the other features of the example in which it is described, or with any of the other features or combination of features of any of the other examples described herein. Furthermore, equivalents and modifications not described above may also be employed without departing from the invention.

Certain features of the methods described herein may be implemented in hardware, and one or more functions of the apparatus may be implemented in method steps. It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented by a controller, such as in the form of computer programs, or in hardware or in any combination thereof. Computer programs include software, middleware, firmware, and any combination thereof. Such programs may be provided as signals or network messages and may be recorded on computer readable media such as tangible computer readable media which may store the computer programs in non-transitory form. Hardware includes computers, handheld devices, programmable processors, general purpose processors, application specific integrated circuits (ASICs), field programmable gate arrays (FPGAs), and arrays of logic gates.

Messages and/or signals described herein may comprise a data payload and an identifier (such as a uniform resource indicator, URI) that identifies the resource upon which to apply the request. This may enable the message to be forwarded across the network to the device to which it is addressed. Some messages include a method token which indicates a method to be performed on the resource identified by the request. For example these methods may include the hypertext transfer protocol, HTTP, methods "GET" or "HEAD". The requests for content may be provided in the form of hypertext transfer protocol, HTTP, requests, for example such as those specified in the Network Working Group Request for Comments: RFC 2616. As will be appreciated in the context of the present disclosure, whilst the HTTP protocol and its methods have been used to explain some features of the disclosure other internet protocols, and modifications of the standard HTTP protocol may also be used.

Other examples and variations of the disclosure will be apparent to the skilled addressee in the context of the present disclosure.

The invention claimed is:

1. A body tissue preservation system for storage and preservation of body tissue, the system comprising:
   a base unit having a reader configured to obtain data from a machine-readable marker;
   a container unit arranged to receive body tissue to be stored and preserved, wherein the container unit comprises the machine-readable marker and is configured as an insert for the base unit; and
   a controller configured to control at least one operational parameter of the storage and/or preservation of body tissue in the container unit based on data obtained from the machine-readable marker, wherein the reader is operable to modify the machine-readable marker to modify data carried by the machine-readable marker.

2. The body tissue preservation system of claim 1, wherein the machine-readable marker and the reader are configured to perform an authentication process to establish authenticated communication prior to transmission of data based on which the at least one operational parameter of the storage and/or preservation is to be based.

3. The body tissue preservation system of claim 1, wherein the reader is configured to modify the data carried by the machine-readable marker to enable a reader to obtain therefrom an indication of whether or not the container unit has previously been used.

4. The body tissue preservation system of claim 3, wherein the controller is configured to inhibit use of a container unit which has previously been used for the storage and preservation of body tissue.

5. The body tissue preservation system of claim 1, wherein the reader is configured to modify the machine-readable marker to provide a time stamp for interaction between the machine-readable marker and the reader.

6. The body tissue preservation system of claim 5, wherein the reader is operable to modify the machine-readable marker to enable a reader to obtain an intended time period of operation for the container unit from the modified machine-readable marker.

7. The body tissue preservation system of claim 1, wherein the body tissue preservation system is configured to persufflate body tissue in the container unit.

8. The body tissue preservation system of claim 1, wherein the machine-readable marker is configured to enable the reader to obtain therefrom container unit data indicative of at least one of: (i) a property of the container unit, (ii) a property of the body tissue in the container unit, and/or (iii) one or more operational parameters for the storage and/or preservation of the body tissue in the container unit.

9. The body tissue preservation system of claim 8, wherein the obtained container unit data provides an indication of a time constraint for using the container unit.

10. The body tissue preservation system of claim 9, wherein the controller is configured to identify a time period during which use of the container unit is intended based on the obtained time constraint.

11. The body tissue preservation system of claim 1, wherein the controller is configured to inhibit use of a container unit which has previously been used for the storage and preservation of body tissue.

12. The body tissue preservation system of claim 1, wherein controlling at least one operational parameter comprises selecting a threshold and/or target value for the operational parameter based on the data obtained from the machine-readable marker.

13. The body tissue preservation system of claim 1, wherein at least one of the reader and the machine-readable marker is configured to inhibit operational parameter data to be obtained from the machine-readable marker by the reader until after an authorisation exchange between the machine-readable marker and the reader.

14. The body tissue preservation system of claim 1, wherein the reader is configured to transmit a first authentication signal to the machine-readable marker including a base unit nonce, and/or wherein the machine-readable marker is configured to transmit a second authentication signal to the reader including a container unit nonce.

15. The body tissue preservation system of claim 14, wherein at least one of the signals transmitted between the reader and machine-readable marker is digitally signed and/or encrypted.

16. The body tissue preservation system of claim 1, wherein the reader is configured to transmit a data request signal to the machine-readable marker comprising a request for the data based on which the at least one operational parameter of the storage and/or preservation of body tissue in the container unit is to be controlled; and
   wherein the machine-readable marker is configured to respond to the data request signal by transmitting a data response signal to the reader, wherein the data response signal comprises the data based on which the at least one operational parameter of the storage and/or preservation of body tissue in the container unit is to be controlled.

17. A body tissue monitoring system comprising:
   a machine-readable marker associated with a body tissue to be monitored;

a base unit having a reader configured to obtain data from the machine-readable marker; and a controller configured to monitor and control at least one parameter of the body tissue and/or the environment surrounding the body tissue;

wherein the reader is configured to obtain an indication of a time constraint from the machine-readable marker; and wherein the controller is configured to identify a time period during which the body tissue is to be monitored and controlled based on the obtained indication of a time constraint, and wherein the controller is configured to monitor and control the body tissue during the time period and to inhibit monitoring and controlling of the body tissue outside the time period, wherein the reader is operable to modify the machine-readable marker to modify data carried by the machine-readable marker.

* * * * *